United States Patent [19]

Hutchings

[11] Patent Number: 4,922,860
[45] Date of Patent: May 8, 1990

[54] CHILD OR DISABLED PERSON TRAINING HARNESS

[76] Inventor: Deborah A. Hutchings, R.R. #2, Westport, Canada, K0G 1X0

[21] Appl. No.: 329,365

[22] Filed: Mar. 27, 1989

[51] Int. Cl.⁵ .................. A01K 29/00; A63B 1/00; A61G 1/00
[52] U.S. Cl. .................. 119/96; 272/70; 294/140
[58] Field of Search .................. 119/96, 29; 128/869–876, 846; 2/44, 45; 182/3, 4; 224/257–259; 244/151 R; 272/70 A, 10.9; 294/140; 297/484

[56] References Cited

U.S. PATENT DOCUMENTS

| | | | |
|---|---|---|---|
| 703,483 | 7/1902 | Schreck | 119/96 |
| 758,123 | 4/1904 | Weis | 119/96 |
| 919,774 | 4/1909 | Rose | 119/96 |
| 1,310,958 | 7/1919 | O'Connor | 119/96 |
| 1,498,593 | 6/1924 | Waiss | 294/140 |
| 1,749,999 | 3/1930 | Crocker | 272/70.3 |
| 2,677,488 | 5/1954 | Prusan | 119/96 |
| 3,252,704 | 5/1966 | Wilson | 272/70.3 |
| 3,701,395 | 10/1972 | Theobald | 119/96 |
| 4,553,633 | 11/1985 | Armstrong et al. | 119/96 |

FOREIGN PATENT DOCUMENTS 270267 5/1927 Canada .
1180387 12/1958 France .................. 272/70.3

*Primary Examiner*—John Weiss
*Attorney, Agent, or Firm*—Nixon & Vanderhye

[57] ABSTRACT

This invention relates to a training harness to assist a child or disabled person learning or readapting to activities requiring motor coordination skills such as walking, skating, skiing or swimming. The present invention is versatile and can accommodate wearers of different body size and weight, without requiring adjustment of the height at which the handle is held as the handle length is corrected when the harness is adjusted for body size and weight.

14 Claims, 4 Drawing Sheets

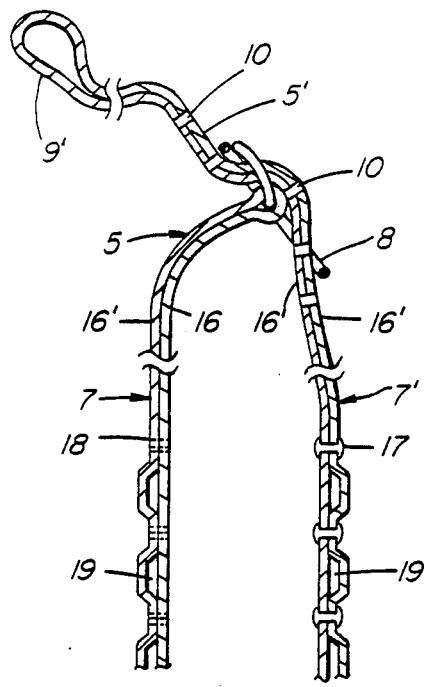
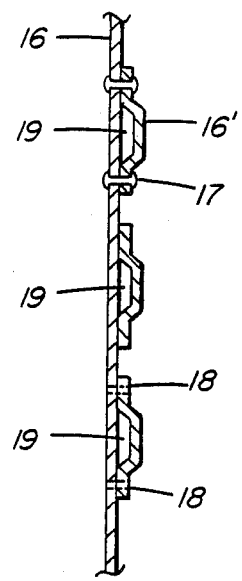
FIG. 4　　　　　　FIG. 5
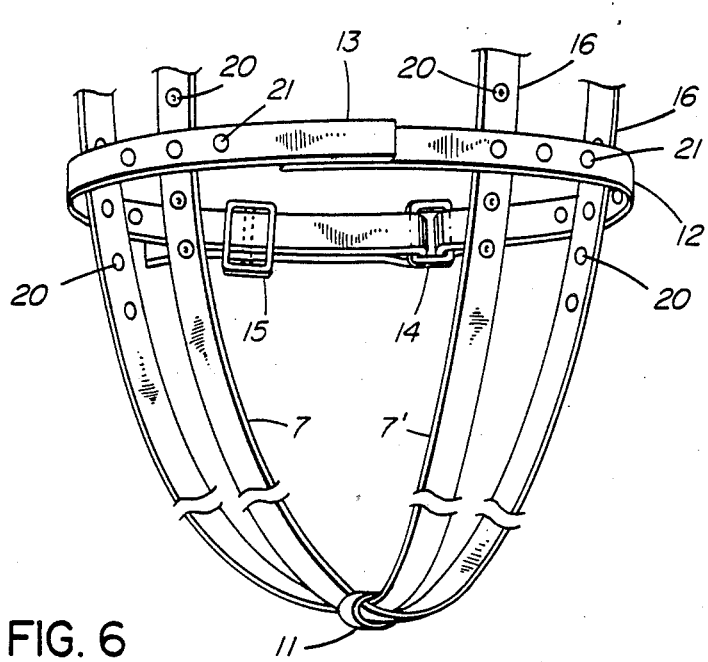
FIG. 6

CHILD OR DISABLED PERSON TRAINING HARNESS

BACKGROUND OF THE INVENTION

This invention generally relates to a training harness designed to be used to assist and support a child while learning activities such as walking, skating, skiing or swimming. The harness is also useful as a safety device to restrain undue movement of a child. The harness can also be used to assist disabled individuals who require support either in the learning stages or in readaptation and rehabilitation stages of mobile activities including walking, skating, skiing or swimming.

The novel training harness is simple in construction and operation, having cooperating chest bands, and support straps. The support straps both engage the wearer's body and extend to become handles for the harness. In a preferred embodiment, the elevation or height at which users hold the handles remains substantially constant regardless of the wearer's torso size, because the height is a function of both the length of the handles and the body height and size of the wearer. The novel training harness further provides good support and balance without restraining movement of the wearer.

Harnesses have been made for many specific applications. For example, U.S. Pat. No. 3,701,395 to Theobald shows a rescue and safety vest with separate front and back portions and with wide leg straps which, in use, encircle the legs of the wearer and provide lifting support therefor in cases where the wearer is unconscious, injured or in an inaccessible place and needs to be lifted without undue pressure on any area of the body. Conversely, the body harness of the present invention is more simple in construction, operation, and is designed so that in use the height of the handle means, which is to be grasped by persons or a mechanism assisting the wearer, is kept substantially constant when the harness is fitted to various body sizes.

Other prior devices, such as disclosed in U.S. Pat. Nos. 703,483 and 758,123, have been used to restrain child movement. U.S. Pat. Nos. 1,310,958 and 2,677,488 also disclose safety harnesses for children which utilize belt and shoulder straps with restraint handles connected to the waist belt. Waist height handles do not provide the desirable level of balanced support for a wearer as is achieved in the present invention.

SUMMARY OF THE INVENTION

The harness of the present invention includes adjustable generally orthogonal strap means adapted to fit around and conform to the body of a wearer, and integral handle means adapted to be held by a person or machine using the harness to support a wearer. The strap means includes a combination of two generally vertical support straps which criss-cross the wearer, and one or more cooperating chest bands which surround and circumscribe the wearers chest. The support straps each have an extension which serve as a handle means.

OBJECTS OF THE INVENTION

It is an object of this invention to provide a novel training harness which may be used to support and assist a child or disabled individual during training in activities requiring practice and motor coordination such as walking, skating, skiing, or swimming. The harness is simple, comfortable, and strong while still being inexpensive to manufacture, and easily fitted to various body sizes.

Another object of this invention is to provide a training harness which includes handles capable of being grasped by a person or mechanism assisting the wearer, such that the handles remain at a generally constant elevation while in use on wearers with different body sizes.

A further object of this invention is to provide an improved training harness which provides good support and balance and does not restrain movement, while in normal use will not slide off or be shaken loose by the wearer.

BRIEF DESCRIPTION OF THE DRAWINGS

Preferred embodiments of the training harness of this invention are illustrated in the accompanying drawings wherein:

FIG. 4 is a cross-sectional view of the dual band embodiment of the support straps;

FIG. 5 is a cross-sectional view of a portion of the single band embodiment of the support straps;

FIG. 6 is a cross-sectional view of the single band embodiment of the support straps with a further embodiment of chest band retention means.

Corresponding parts in the respective figures are indicated by similar reference numbers.

DETAILED DESCRIPTION OF THE INVENTION

The training harness of this invention comprises a combination of an adjustable chest band and two adjustable support straps. Each support strap has a torso engaging portion commencing with an adjustable fastening means at one end of the strap which is positioned at one shoulder of the wearer. The strap extends down one side of the wearer's chest or back, under the crotch area and up over the other side of the wearer's back or chest, where it connects with the fastening means of the other strap positioned at the wearer's opposite shoulder. Each strap has a handle portion comprising the remaining length of the strap which extends to a terminal handle means. The total length of each strap does not change, but the lengths of the handle portion and the torso engaging portions are inversely adjustable, such that lengthening of the one shortens the other. The chest band is adapted to cooperate with the support straps about the torso of the wearer to retain the chest band at a selected position.

Figure 1:
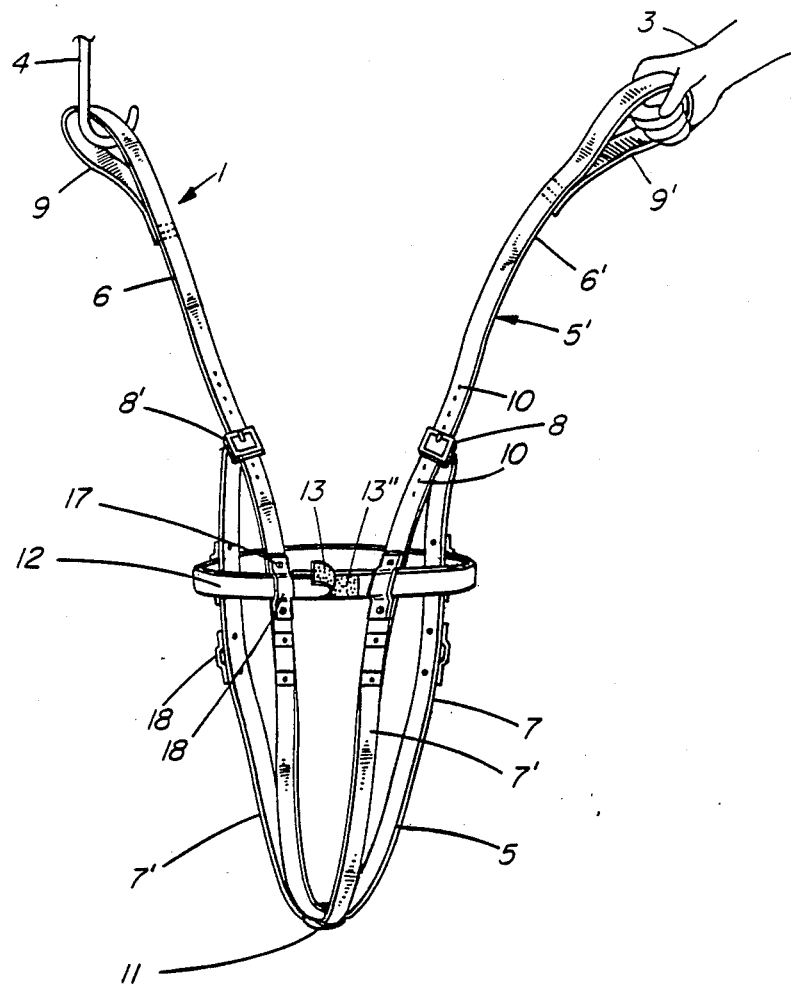
FIG. 1 shows a front perspective view of the novel training harness.
Figure 2:
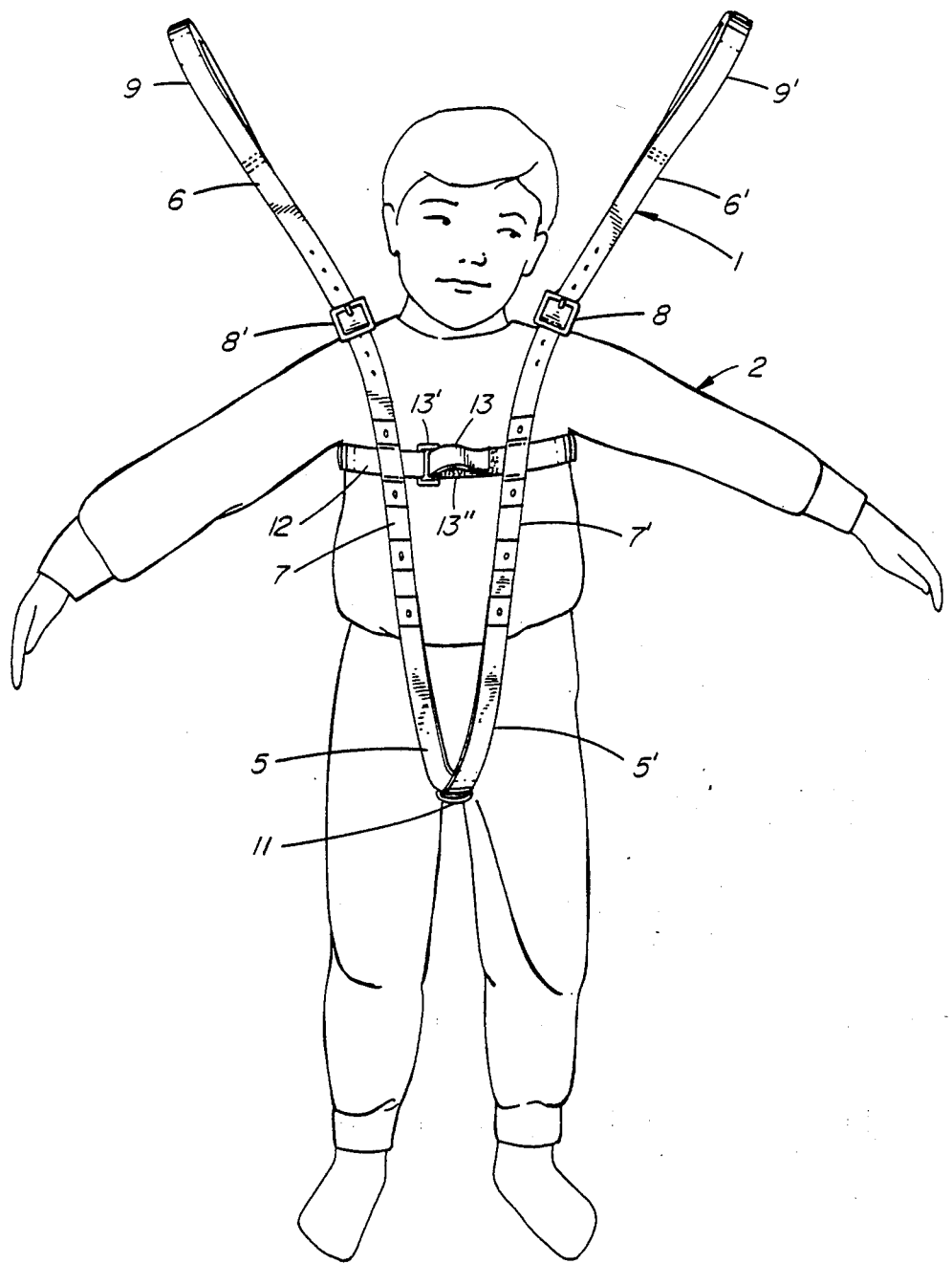
FIG. 2 is a front view of the harness, on a wearer.
Figure 3:
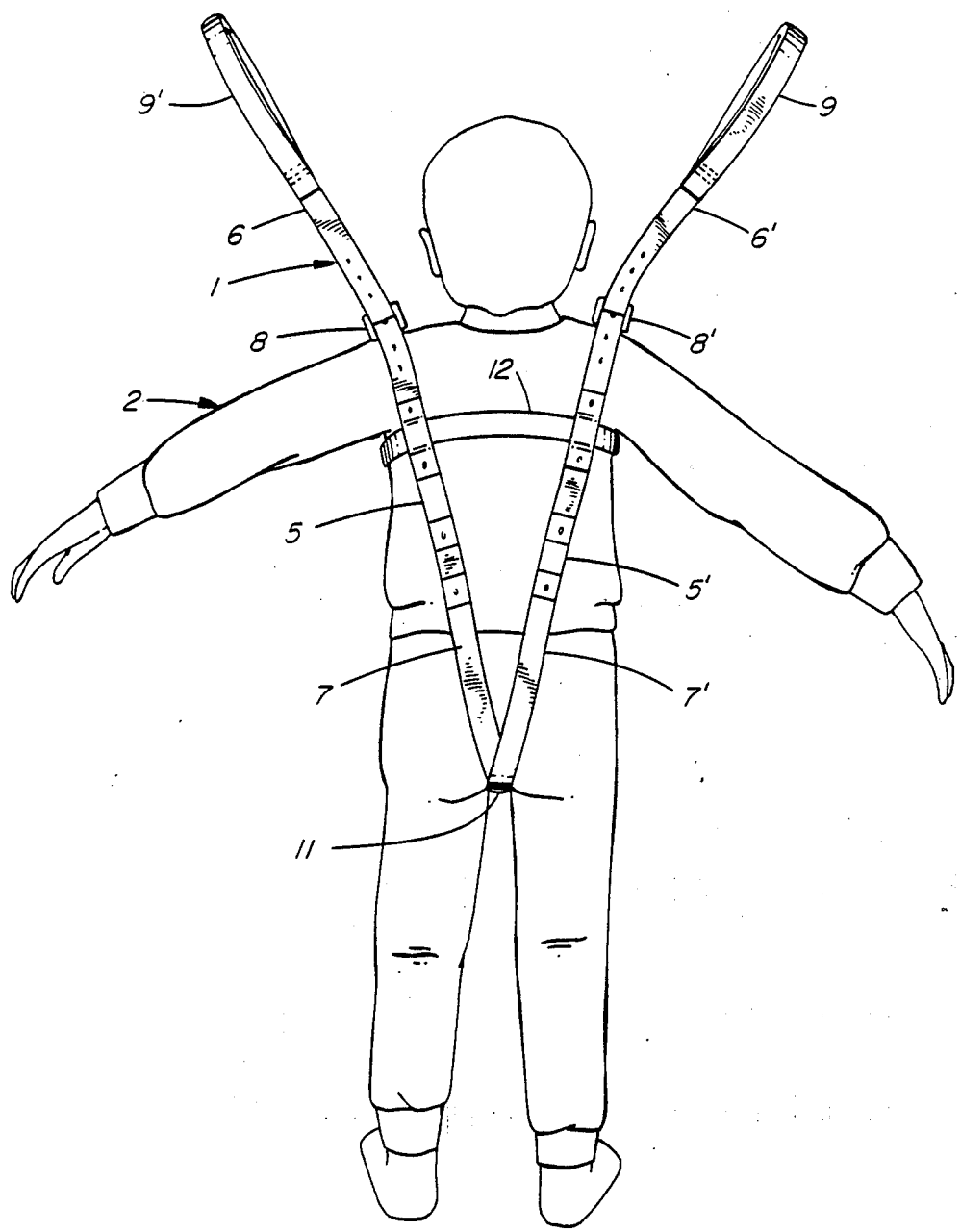
FIG. 3 is a back view of the harness on a wearer.

Referring now to FIGS. 1, 2 and 3 the training harness of the present invention is generally indicated at 1, with its position on a wearer 2 shown in FIGS. 2 and 3. The harness 1 is adapted to be gripped or secured either manually by a person's hand 3 or by a support 4 of a training mechanism. The harness includes two support straps 5 and 5' of identical construction. Each support strap has a handle portion 6 (6') which is used to hold the harness and support the wearer, and a torso engaging portion 7 (7') which wraps around the wearers body. The support straps have buckles 8 (8') at one end, and handles 9 (9') at the other end. In use, the strap 5 (5') is wrapped about a wearer's body with a buckle 8 (8') at one shoulder of the wearer, with the torso engaging portion 7 (7') of the strap extending downwardly at an angle from the shoulder, across the wearer's body to pass under the crotch and up the other side to the wearers other shoulder where it engages with the buckle 8' (8) of the other strap 5' (5). Each strap further extends into handle portion 6 (6') and terminates with loop handles 9 (9'). The criss-cross position of the support strap may be maintained by closure loop 11 around both straps at the crotch.

As may be seen in FIG. 1, the shank of buckle 8 (8') is connected to one end of the support strap 5 (5') remote from the handle 9 (9'). The prong of the buckle 8 (8') engage a series of eyelets 10 located on the support strap 5 (5') generally at the division between the torso engaging portion 7 (7') and the handle portion 6 (6'). Each support strap may be provided with an adequate range of longitudinally displaced eyelets to allow the body harness to be snugly fitted to wearers having different body sizes. As an alternative to buckles 8 (8'), other fastener means may be used such as web slides, or adjustable quick release couplings such as FAS-TEX TM connectors.

A chest band 12 is employed, in conjunction with the support straps 5 (5') to provide a secure means of retaining the wearer in the harness by restraining the support straps from slipping off a wearer's shoulders and to supplement the balance characteristics of the harness. The band is passed circumjacent the chest of the wearer to closely surround the wearer.

Chest band 12 comprises a web of suitable material which has cooperating fastening means at each end. As may be seen in FIG. 1, band 12 has cooperating VELCRO TM type hook and pile (tear tape) surfaces 13 and 13" respectively at the respective ends, so as to provide for a substantial range of adjustment for chest size. As may be seen from FIG. 6, extended adjustability can be achieved by supplementing the tear tape closure with a further conventional adjustment system used with a two-piece band having an D-ring 14 on one piece cooperating with a reversed length of web on the other piece which is adjustable with a web slider 15.

An alternative adjustable connection is shown in FIG. 2, where a VELCRO TM tear tape hook portion 13 is passed through D-ring 13' and reversed for fastening against a pile portion 13".

Alternatively the chest band 12 may be provided with an adjustable release connector, such as D-rings, a quick release buckle, spring clips or ordinary buckles.

The chest band 12 is positioned high across the chest passing under the arms of the wearer. The position of the band 12 is maintained by passing the band through selected slots or loops in the support straps 5 (5'). As may be seen in FIG. 4, in one embodiment of this invention, each support strap 5 (5') comprises two adjacent or overlapping webs 16 and 16' of strap material. The webs 16 and 16' are held together by a series of connection means, for example rivets 17 or stitching points 18, positioned along a substantial portion of the torso engaging portions 7 (7') of the support straps 5 (5'). The connection means create a series of vertically displaced slots or loops 19 between the webs 16 and 16'. Slots 19 are open at each edge to create substantially horizontal passages at multiple heights over the front and back sections of the torso engaging portions 7 and 7' of the training harness. The chest band 12 can then be inserted through selected slots in a generally horizontal plane, thereby securing the chest band from vertical movement and restraining lateral movement of the support straps 5 (5'). Sufficient slots must be provided to provide an effective range of adjustment for the chest band.

The webs 16 and 16' of the support straps 5 (5') may be formed by a doubled length of webbing, such that the bight of the webbing forms the handles 9 (9'). The two layers of webbing are preferably interconnected by any suitable means such as fusing or heat welding, gluing or stitching at all portions which do not require separation for loops 19, or handles 9 (9').

In an alternative form of construction illustrated in FIG. 5, each support strap may be constructed of a single web 16 of strap material with discontinuous portions of a second web of material intermittently connected to form the series of loops 19 suitable for insertion and retention of the chest band 12.

In yet another embodiment of the invention illustrated in FIG. 6, each support strap may be constructed of a single web 16 of strap material with supplemental retainers for the chest band 12. Such retainers may be dome fasteners or other suitable means. As seen in FIG. 6, the base portions of the fasteners 20 are positioned generally along portions of the outwardly or exteriorly facing surfaces of the torso engaging portions 7 (7') of the support straps 5 (5') such that they provide a vertical series of snap positions. A complementary series of domes 21 positioned along the chest band can be provided to mate with the bases 20 to retain both the chest band and support straps in position. Alternatively, slidable domes and bases may be provided on the respective band and straps to adjustably position the dome connection.

The present invention is versatile and can accommodate wearers of different body size and weight, without requiring a separate adjustment for the handle length, which determines the height at which the handle is held. The height or elevation of the handles, when held by a user, is a function of both the length of the handle portion of the strap and the body height and size of the wearer. Since the support portion and handle portion are a single strap, when the harness is worn by a larger person, greater strap length is required for the torso engaging portions 5 (5') to fit the harness to such larger wearer than if worn by a person of small stature. Consequently, less strap length remains available for the handle portions 6 (6'). However, the increased shoulder height of a larger person results in greater elevation of the buckles 8 (8') thereby compensating for reduced handle portion length. The opposite effect occurs with smaller persons, whereby reduced body size results in lower shoulder height, and shorter torso engaging portion length but extended handle portion length to result in the same handle elevation. Generally, the combination of these two factors results in a substantially constant elevation of handles 9 (9') when the training harness is fitted to wearers of varying body size.

As well the training harness may be economically made from any suitable material. I have found nylon webbing to be of satisfactory strength and durability, although the harness can be made from other equivalent synthetic materials such as polyester, polypropylene or natural materials such as leather. The synthetic materials are particularly desirable if the harness is used for activities associated with water or moisture conditions.

Similarly, it will be readily understood that other types of adjustable fastening means other than the specific buckles and fasteners described above may be used without departing from the spirit of this invention. I have found VELCRO ™ type hook and loop (tear tape) fasteners to be particularly appropriate to the chest band.

In use, the harness is snugly fastened about the wearer's body, with the fasteners tightened suitably against the wearer's shoulders, and the chest band positioned generally horizontally snugly around the wearer's chest just below the arms. This position will support a wearer, when held by the handles, in a generally vertical position, above the wearer's center of gravity and inhibit unbalanced movement.

If the harness is to be used in exercise such as swimming which requires the assumption of a generally horizontal position by the wearer, the chest band and support straps can be repositioned, such that the shoulder fasteners are relocated over the wearer's shoulder blades. The chest band can then be reinserted into selected loops or slots 19 to maintain the same position as when worn for upright use, namely high on the chest, just below the arms.

While the invention has been described with respect to preferred embodiments, it will be apparent to those skilled in the art that changes and modifications may be made without departing from the scope of the invention herein involved in its broader aspects. Accordingly, it is intended that all matter contained in the above description, or shown in the accompanying drawings shall be interpreted as illustrative and not limitative.

The embodiments of the invention in which an exclusive property or privilege is claimed are defined as follows:

1. A body harness for supporting the body of a wearer, said body harness comprising an adjustable chest band and adjustable support strap means including two straps, each of which straps has an adjustable fastener at one end and a handle at the other end and includes a torso engaging portion adapted to extend from said fastener positioned generally at one shoulder of the wearer, under the crotch area of the wearer and to connect to the other fastener of the other strap at the wearer's opposite shoulder, and a handle portion extending from the fastener to said handle, whereby the relative lengths of the torso engaging portion and the handle portion are adjustable, and wherein said chest band is adapted to be circumjacent the wearer's chest and to cooperate with said adjustable support strap means to retain the chest band at a selected position.

2. A body harness as in claim 1, wherein each strap includes overlying webs joined at selected points generally throughout the torso engaging portion of said strap, such that the intervals between the points form a series of slots between the webs for selective insertion and retention of the chest band therein.

3. The body harness of claim 2, wherein one web is discontinuous, and joined to the underlying web at the points of discontinuity.

4. The body harness of claim 1, wherein the support strap means are provided with fastening surfaces on the exterior face of the torso engaging portions and said chest band is provided with fastening surfaces on the face of the band adjacent the wearer, whereby the respective fastening surfaces cooperate to prevent lateral displacement of said straps and to retain the chest band at a selected position.

5. The body harness of claim 1, wherein the chest band is positioned generally horizontally.

6. The body harness of claim 1, wherein said chest band is provided with an adjustable quick release coupling means.

7. The body harness of claim 4, wherein the chest band is positioned generally horizontally and is provided with an adjustable quick release coupling means.

8. The body harness of claim 1, wherein the adjustable fastener comprises a buckle and said support straps are provided with eyelets generally intermediate the length of the strap to cooperate with the buckle to permit suitable adjustment of the harness about the wearer's body.

9. The body harness of claim 1, wherein the adjustable fastener is a quick release coupling means.

10. The body harness of claim 1, wherein the straps cross at the crotch area and are held together by a retaining means.

11. The body harness of claim 1, wherein the straps cross at the crotch area and are held together by a retaining means comprising a closed loop of flexible material adapted to closely encircle the crossed support straps at a point proximate the crotch area of the wearer.

12. The body harness of claim 1, wherein the straps and band are webbing of a fabric of synthetic resin.

13. The body harness of claim 1, wherein the straps and band are webbing of natural leather.

14. The body harness of claim 1, wherein the straps and band are webbing of a fabric of synthetic resin.

* * * * *